United States Patent [19]

Gorecki

[11] Patent Number: 4,556,866
[45] Date of Patent: Dec. 3, 1985

[54] POWER LINE CARRIER FSK DATA SYSTEM
[75] Inventor: James L. Gorecki, Chandler, Ariz.
[73] Assignee: Honeywell Inc., Minneapolis, Minn.
[21] Appl. No.: 475,802
[22] Filed: Mar. 16, 1983
[51] Int. Cl.[4] .................. H04L 27/10; H03D 3/18; H03C 3/00
[52] U.S. Cl. .................. 340/310 A; 375/45; 375/62; 375/81; 375/88; 329/50
[58] Field of Search ............ 375/45, 62, 65, 81, 375/88, 120, 9; 340/310 A, 310 R; 329/50

[56] References Cited

U.S. PATENT DOCUMENTS

| | | | |
|---|---|---|---|
| 3,900,842 | 8/1975 | Calabro et al. | 340/310 |
| 3,902,013 | 8/1975 | Charbonnier | 178/66 |
| 3,908,115 | 9/1975 | Waggener | 235/152 |
| 3,909,618 | 9/1975 | Fugii et al. | 307/3 |
| 3,986,121 | 10/1976 | Oehrli | 325/37 |
| 4,017,803 | 4/1977 | Baker | 375/81 |
| 4,021,744 | 5/1977 | Montefusco | 329/105 |
| 4,057,793 | 11/1977 | Johnson et al. | 340/310 |
| 4,060,735 | 11/1977 | Pascucci et al. | 307/3 |
| 4,135,181 | 1/1979 | Bogacki et al. | 340/310 |
| 4,139,735 | 2/1979 | Dorfman et al. | 179/2.5 |
| 4,161,720 | 7/1979 | Bogacki | 340/150 |
| 4,162,486 | 7/1979 | Wyler | 340/310 |
| 4,163,218 | 7/1979 | Wu | 340/310 |
| 4,173,754 | 11/1979 | Feiker | 340/310 |
| 4,185,272 | 2/1980 | Feiker | 340/168 |
| 4,200,862 | 4/1980 | Campbell et al. | 340/310 |
| 4,216,543 | 8/1980 | Cagle et al. | 375/95 |
| 4,218,769 | 8/1980 | Cagle | 375/95 |
| 4,229,822 | 10/1980 | Bench | 375/81 |
| 4,239,940 | 12/1980 | Dorfman | 179/2.51 |
| 4,245,215 | 1/1981 | O'Connor et al. | 340/310 |
| 4,250,489 | 2/1981 | Dudash et al. | 340/147 |
| 4,283,682 | 8/1981 | Sifford et al. | 329/50 |
| 4,388,574 | 6/1982 | Fujita et al. | 329/50 |
| 4,388,727 | 6/1983 | Metcalf | 375/81 |

Primary Examiner—Jin F. Ng
Assistant Examiner—Curtis Kuntz
Attorney, Agent, or Firm—Theodore F. Neils; David R. Fairbairn

[57] ABSTRACT

A frequency shift keyed (FSK) data transmission system utilizes existing power lines to transmit data by superimposing a high frequency FSK signal on the power line carrier. A transmitter includes a phase locked loop which is locked on the power line carrier frequency and which synthesizes the FSK signal and a timing signal which defines the data rate of the transmitter. As each bit is transmitted, an oscillator control signal either speeds up or slows down the loop oscillator temporarily to produce the FSK signal. A receiver demodulates the data transmission from the power line by separating a power line carrier frequency component and a FSK signal component. The receiver includes a phase locked loop which locks onto the power line carrier frequency and which synthesizes a reference frequency and a timing signal which defines the data rate of the receiver. The receiver also includes a frequency discriminator circuit which compares the FSK signal with the synthesized reference signal and produces a digital data output signal at the data rate synthesized by the phase locked loop.

17 Claims, 9 Drawing Figures

FIG. 5A
FIG. 5B
FIG. 5C
FIG. 5D
FIG. 5E
FIG. 5F
FIG. 5G

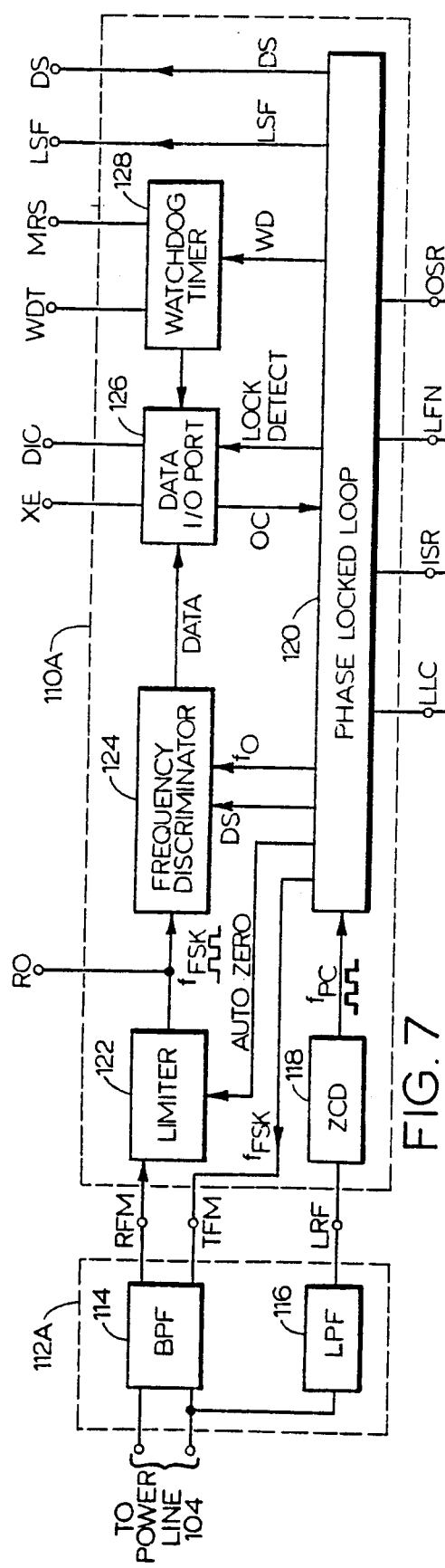
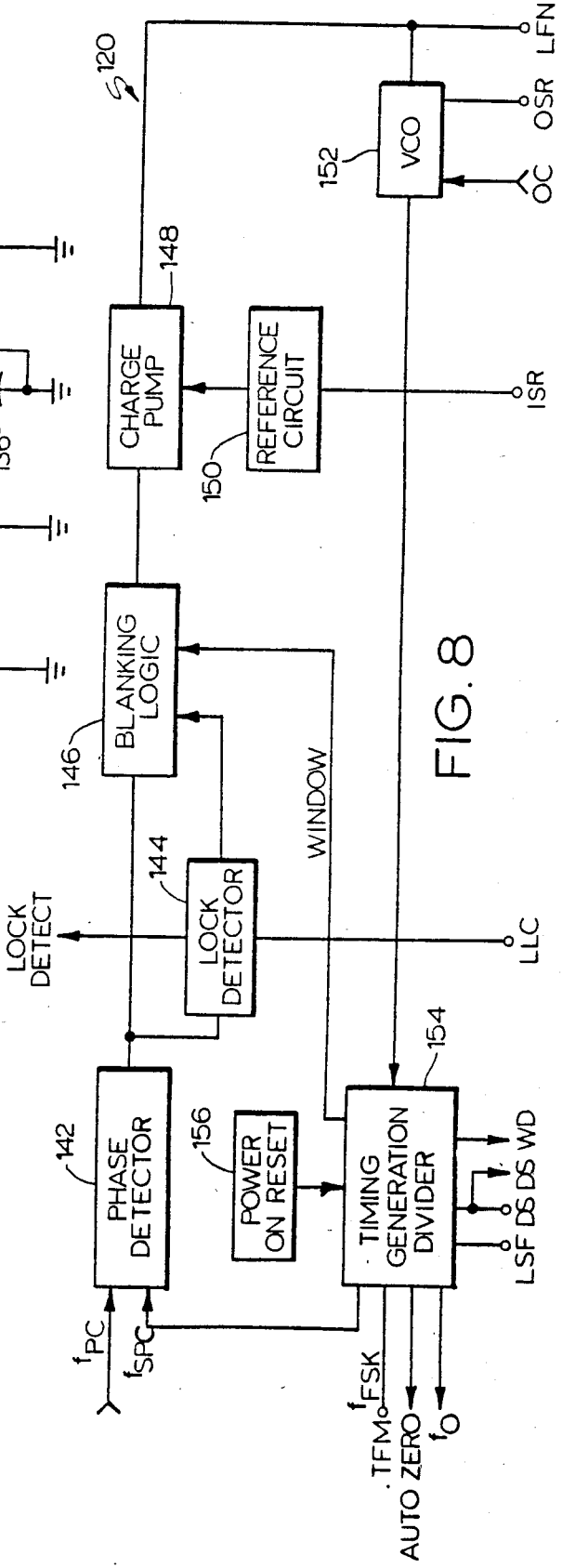
FIG. 7
FIG. 8

POWER LINE CARRIER FSK DATA SYSTEM

REFERENCE TO COPENDING APPLICATIONS

Reference is hereby made to the following co-pending patent applications which are assigned to the same assignee as the present application:

"System For Preventing Transcient Induced Errors in Phase Locked Loop", G. Kachman, Ser. No. 306,272, filed Sept. 28, 1981, now U.S. Pat. No. 4,389,622 issued 6/21/83.

"Improved Frequency Shift Keyed Detector System", M. Hendrickson, Ser. No. 306,273, filed Sept. 28, 1981, now U.S. Pat. No. 4,412,338 issued 10/25/83.

"Phase Velocity Sign Detector For Frequency Shift Key Demodulation", M. Maas, Ser. No. 404,959, filed Aug. 4, 1982, now U.S. Pat. No. 4,499,425 issued 2/12/85.

"Frequency Shift Key Demodulator", M. Maas and M. Hendrickson, Ser. No. 404,955, filed Aug. 4, 1982, now U.S. Pat. No. 4,486,715 issued 12/04/84.

"CMOS Window Detector With Hysteresis", W. Linder, Ser. No. 418,512, filed Sept. 16, 1982, now U.S. Pat. No. 4,503,340, 3/05/85.

"Data Communication System With Fixed Weight Error Correction and Detection Code", B. Ohme, Ser. No. 457,986, filed Jan. 14, 1983.

BACKGROUND OF THE INVENTION

1. Field of the Invention

The present invention relates to communication systems utilizing frequency shift keyed (FSK) data transmission. In particular, the present invention relates to an FSK data transmission system in which an FSK signal is superimposed on a power line carrier.

2. Description of the Prior Art

In the past, there have been numerous proposals for communications systems which utilize existing power lines to carry the communication signals. One application of this type of communication system is for remote control of appliances and other electrical loads in homes and commercial buildings for convenience and energy management.

The power line carrier systems normally use a radio frequency (RF) signal which is superimposed with the power line carrier frequency (typically 60 Hz in the United States). The particular data transmission format for the RF signal can take one of several well-known formats.

One advantageous digital data transmission format is frequency shift keyed (FSK) transmission. An FSK transmitter modulates a reference frequency signal based upon the data to be transmitted, so that the transmitted signal has a frequency ($f_{FSK}$) which is either slightly greater than or slightly less than the frequency ($f_O$) of the reference signal. In typical FSK transmission systems, a frequency $f_{FSK}$ which is greater than $f_O$ represents a digital "1" while a frequency $f_{FSK}$ which is less than $f_O$ represents a digital "0". An FSK receiver receives and demodulates the transmitted FSK signal to produce a serial data stream at a predetermined data rate (or "baud rate"). Each bit of the data stream is based upon the frequency of the FSK signal during one bit time period.

In the prior art, FSK receivers have often been quite complicated and required extensive high precision components. The cost and complexity of FSK transmission systems has, as a result, limited the applicability of FSK transmitters and receivers in power line carrier communication systems.

There is a continued need for power line carrier FSK data systems which eliminate the need for costly precision components and yet provide reliable transmission of data.

SUMMARY OF THE INVENTION

The present invention is an improved power line carrier communication system in which data is transmitted by means of an FSK signal which is superimposed on the power line carrier and is transmitted through existing power lines. The power line carrier communication system includes an FSK transmitter having a phase locked loop which locks onto the power line carrier frequency. The phase locked loop synthesizes signals having frequencies higher than the power line carrier frequency, including the FSK signal and a timing signal which determines the transmitter data rate. The loop includes oscillator means which produces the FSK signal with a frequency which is a function of first and second oscillator control signals. The first oscillator control signal is a function of the phase relationship of the input power carrier frequency signal and a synthesized carrier frequency signal derived from the FSK signal. The second oscillator control signal is a function of the binary state of the data bit to be transmitted.

An FSK receiver receives the signal from the power line and separates out a power line carrier frequency component and an FSK signal component. The receiver includes a phase locked loop which is locked to the power line carrier frequency and which synthesizes higher frequency signals including a reference frequency signal and a timing signal which determines the receiver data rate.

The receiver also includes a frequency discriminator which compares the FSK signal with the reference frequency signal synthesized by the phase locked loop. The frequency discriminator provides a digital data output based upon the comparison of the FSK signal and the reference frequency at the receiver data rate which is determined by the timing signal synthesized by the phase locked loop.

With the present invention, therefore, the data rate, the FSK signal frequency and the reference frequency used by the transmitter and the receiver are derived from and are synchronized with the power line carrier frequency. The power line carrier frequency, therefore, provides a common reference between the transmitter and receiver. With the present invention, therefore, expensive precision components are not required since all critical frequencies are derived from the power line carrier frequency in both the receiver and transmitter. In addition, synchronous detection between the receiver and transmitter is achieved.

BRIEF DESCRIPTION OF THE DRAWINGS

FIGS. 5A through 5G a representation of waveforms illustrating operation of a frequency disciminator circuit of the demodulator of FIG. 4.

FIG. 7 is a block diagram of the power line carrier modem and signal conditioning circuits of the system of FIG. 6.

FIG. 8 is a block diagram of the phase locked loop of the power line carrier modem of FIG. 7.

DETAILED DESCRIPTION OF THE PREFERRED EMBODIMENTS

The System of FIGS. 1-5

Figure 1:
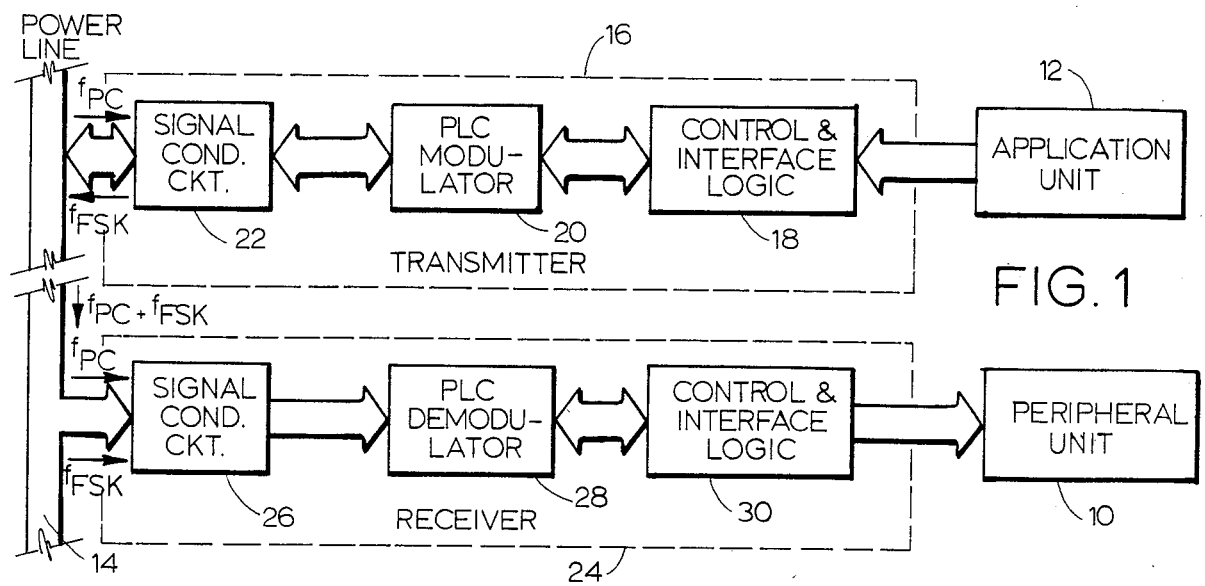
FIG. 1 is a block diagram of a first embodiment of the power line carrier FSK data system of the present invention.

FIG. 1 shows a power line carrier FSK data system which provides remote control of a peripheral unit 10 (such as an appliance or other electrical load) based upon control signals from application unit 12 (such as computer). Control signals are communicated from application unit 12 to peripheral unit 10 using an existing alternating current (AC) power line 14 instead of using special wiring between application unit 12 and peripheral unit 10.

Transmitter 16 receives control signals in the form of digital data from application unit 12 and converts the digital data to frequency shift keyed (FSK) signals which are superimposed onto power line 14. In the embodiment shown in FIG. 1, transmitter 16 includes control and interface logic 18, power line carrier (PLC) modulator 20, and signal conditioning circuit 22. Control and interface logic 18 receives the digital data from application unit 12 and provides the control signals to PLC modulator 20 to cause the output of PLC modulator 20 to be an FSK signal which represents a digital "1" or a digital "0". In one preferred embodiment of the present invention, control and interface logic 18 includes encoding circuitry for encoding the data from application unit 12 using a code which enables detection and in some cases correction of errors which have been corrupted by noise during transmission over power line 14.

Based upon a control signal from control and interface logic 18, PLC modulator 20 generates a radio frequency (FSK) signal which has a frequency $f_{FSK}$ which is greater than a reference frequency $f_O$ to represent a binary "1", and which is less than reference frequency $f_O$ to represent a binary "0". The FSK signal produced by PLC modulator 20 is synthesized from (and therefore synchronized to) the carrier frequency $f_{PC}$ of the electrical power on power line 14. In the United States, frequency $f_{PC}$ is typically 60 Hz. The data rate of PLC modulator 20 is also determined based on a timing signal synthesized from the power line carrier frequency $f_{PC}$.

Signal conditioning circuit 22 interfaces PLC modulator 20 with power line 14. In preferred embodiments, signal conditioning circuit 22 includes filter circuits which allow the power line frequency $f_{PC}$ to be provided to PLC modulator 20, and allow the FSK signal produced by PLC modulator 20 to be superimposed onto power line 14.

Receiver 24 demodulates the FSK signal which is superimposed on power line 14. As shown in FIG. 1, receiver 24 includes signal conditioning circuit 26, PLC demodulator 28, and control and interface logic 30.

Signal conditioning circuit 26 is connected to power line 14 and provides to PLC modulator 28 an FSK signal component having frequency $f_{FSK}$ and a power carrier signal component having a frequency $f_{PC}$. PLC demodulator 28 utilizes frequency $f_{PC}$ to synthesize the reference frequency $f_O$ and the timing signals which are used by control and interface logic 30. Among the timing signals which are synthesized is one which determines the data rate at which the FSK signal is demodulated.

Control and interface logic 20 receives the demodulated digital data stream from PLC demodulator 28 and produces the control signals which are supplied to peripheral unit 10. In a preferred embodiment, control and interface logic 30 includes decoding circuitry which decodes the encoded digital data and detects the presence of errors in the data from PLC demodulator 28. In this way, execution by peripheral unit 10 of commands which have been corrupted by noise in the communication channel is avoided.

Figure 2:
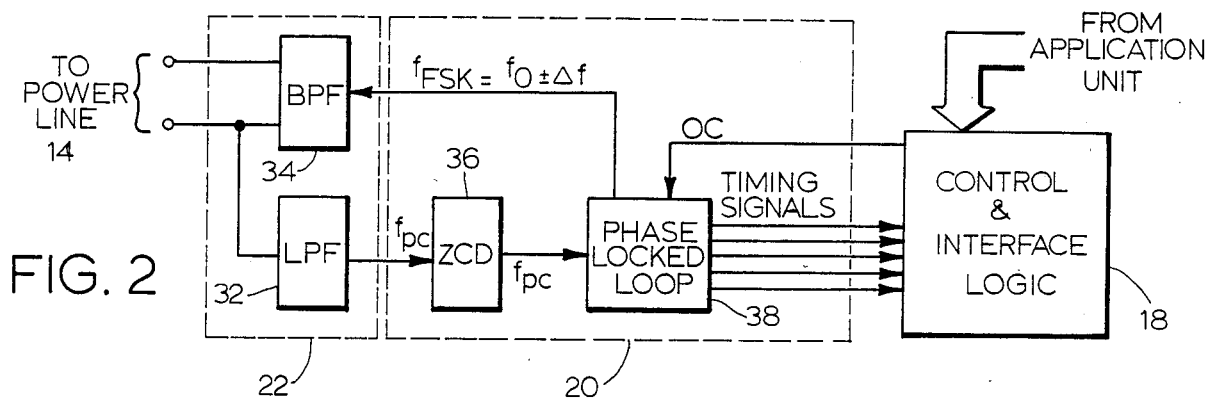
FIG. 2 is a more detailed block diagram of a preferred embodiment of the FSK transmitter of the system of FIG. 1.

FIG. 2 shows a more detailed block diagram of transmitter 16 of the system of FIG. 1. In the embodiment shown in FIG. 2, signal conditioning circuit 22 includes low pass filter 32 and band pass filter 34. Low pass filter 32 provides the power line carrier frequency $f_{PC}$ to PLC modulator 20. Band pass filter 34 passes the FSK signal frequency $f_{FSK}$ from PLC modulator 20 onto power line 14.

PLC modulator 20 includes zero crossing detector (ZCD) 36 and phase locked loop 38. Zero crossing detector 36 receives the sinusoidal power line carrier $f_{PC}$ from low pass filter 32, and provides a square wave signal having frequency $f_{PC}$ to phase locked loop 38. In a preferred embodiment of the present invention, phase locked loop 38 utilizes the rising edge of the square wave signal from zero crossing detector 36, which corresponds to the upward zero crossing of the sinusoidal signal received by zero crossing detector 36 from low pass filter 32. Phase locked loop 38 is a second order phase locked loop which is locked to the power line carrier frequency $f_{PC}$. Phase locked loop 38 acts as a frequency synthesizer which generates a synthesized power carrier frequency $f_{SPC}$ which is compared with $f_{PC}$, and also generates higher frequency signals including $f_{FSK}$ and timing signals used by control and interface logic 18.

Figure 2A:
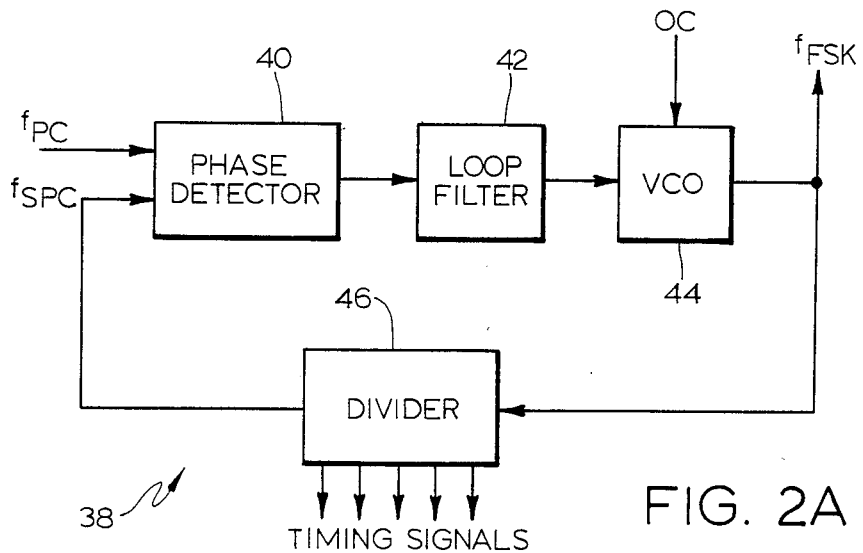
FIG. 2A is a block diagram of the phase locked loop of the FSK transmitter of FIG. 2.

FIG. 2A is a block diagram of one preferred embodiment of phase locked loop 38, which includes phase detector 40, loop filter 42, voltage controlled oscillator (VCO) 44, and divider 46. Phase detector 40 is a digital tristate phase detector which compares the rising edges of the signal $f_{PC}$ from zero crossing detector 36 and the rising edges of the synthesized signal $f_{PC}$ from divider 46. The output of phase detector 40 is supplied to loop filter 42, which provides a control signal to VCO 44. The output of VCO 44 is frequency $f_{FSK}$, which is supplied to band pass filter 34, and also to divider 36. Frequency $f_{FSK}$ from VCO 44 is divided down by divider 46 to produce the timing signals as well as the synthesized power carrier frequency $f_{SPC}$. These timing signals include a signal which defines the data rate of the data transmitted by transmitter 16. The result of operation of phase locked loop 38 is to ensure that the leading edges of $f_{PC}$ and $f_{SPC}$ are synchronized. In addition, the FSK signal from VCO 44 and the timing signals from divider 46 are all locked to the rising edges (i.e. the upward zero crossings) of the power line carrier frequency $f_{PC}$.

Control and interface logic 18 provides an oscillator control (OC) signal to VCO 44 to slightly shift frequency $f_{FSK}$ above a reference frequency $f_O$ to produce a binary "1", or below $f_O$ to produce a binary "0". The OC signal from control and interface logic 18 is determined by the data received from application unit 12, and it is changed at a data rate determined by one of the timing signals synthesized by phase locked loop 38.

Figure 3:
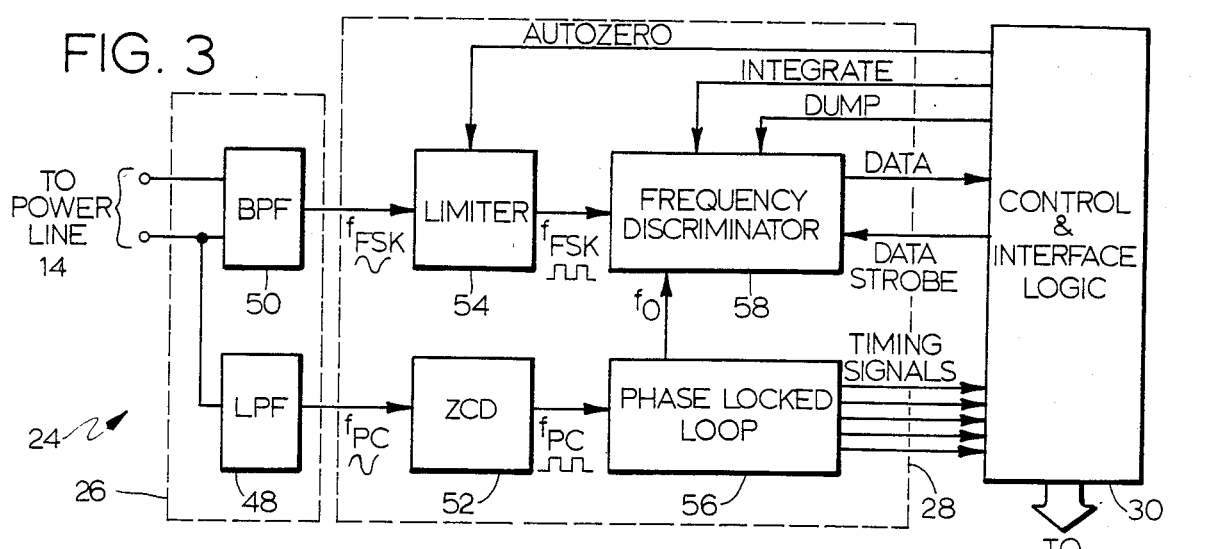
FIG. 3 is a more detailed block diagram of a preferred embodiment of the FSK receiver of FIG. 1.

FIG. 3 shows a more detailed block diagram of receiver 24, which demodulates the FSK signal received on power line 14. The operation of receiver 24 is synchronized to transmitter 16 by the power line carrier frequency $f_{PC}$.

Signal conditioning circuit 26 of receiver 24 includes low pass filter 48 and band pass filter 50. Low pass filter 48 provides the power line carrier frequency $f_{PC}$ to zero crossing detector 52 of PLC demodulator 28. Band pass filter 50 provides the FSK signal frequency $f_{FSK}$ to limiter 54 of demodulator 28.

The output of zero crossing detector 52 is a square wave digital signal having a frequency $f_{PC}$. Each rising edge of the $f_{PC}$ signal from zero crossing detector 52 corresponds to an upward zero crossing of the sinusoidal signal from low pass filter 48.

Phase locked loop 56 is, like phase locked loop 38 of PLC modulator 20, a second order phase locked loop which is locked into $f_{PC}$ and which synthesizes higher frequency signals. These higher frequency signals include timing signals which are supplied by phase locked loop 56 to control and interface logic 30, as well as reference frequency $f_O$ which is used by frequency discriminator 58 to convert the FSK signal to digital data.

Limiter 54 is preferably an auto zero comparator which converts the FSK signal from band pass filter 50 to a square wave signal having frequency $f_{FSK}$ and having the necessary logic levels for frequency discriminator 58. Limiter 54 is periodically zeroed by an AUTO ZERO signal from control and interface logic 30. The AUTO ZERO signal is derived from timing signals produced by phase locked loop 56.

In the embodiment shown in FIG. 3, frequency discriminator 58 employs an integrate and dump technique to compare frequency $f_{FSK}$ from limiter 54 and reference frequency $f_O$ from phase locked loop 56. Control and interface logic 30 provides an INTEGRATE signal, a DUMP signal and a DATA STROBE signal to frequency discriminator 58, and receives the output data produced by frequency discriminator 58 based upon the comparison of frequencies $f_{FSK}$ and $f_O$. The INTEGRATE, DUMP and DATA STROBE signals are generated by control and interface logic 30 based upon the timing signals from phase locked loop 56.

In receiver 24 and transmitter 16, all of the timing signals, the data rate, the FSK frequency, and the reference frequency are synchronized with zero crossings of the power line carrier signal. This assures synchronous detection between transmitter 16 and receiver 24 without the use of the prior art encoding techniques which required a clock frequency to be transmitted. With the present invention, receiver 24 does not have a lock acquisition time associated with it because synchronization with the power line carrier frequency provides a coherent FSK data transmission.

Because all critical frequencies are derived from power line carrier frequency $f_{PC}$ in both transmitter 16 and receiver 24, the need for costly external components (such as crystals) or component trimming is eliminated. In addition, problems associated with component drift over time are eliminated.

In one preferred embodiment of the present invention, frequencies $f_{FSK}$ and $f_O$ are in a range of about 50 KHz to about 270 KHz. This frequency range is high enough that the signals from transmitter 16 will not bridge a power transmission transformer. This ensures that the signals being transmitted over the power lines are "local". In other words, only those areas connected to the secondary of the same transformer will receive the transmitted FSK signal. In a typical application, this means that the FSK signals will be limited to a single industrial or commercial building, and will not interfere with similar systems being used in other buildings.

The frequency range of $f_O$ and $f_{FSK}$ is low enough so as not to interfere with the commercial broadcast band. Although the frequency range can extend above 270 KHz this requires additional filtering circuitry to remove the second harmonic of the FSK signals which might otherwise interfere with the broadcast bands.

In one embodiment of the system of FIGS. 1–5, $f_O = 120$ KHz, FSK $= 120$ KHz $\pm 2.4$ KHz, and the data rate is 1200 band.

Figure 4:
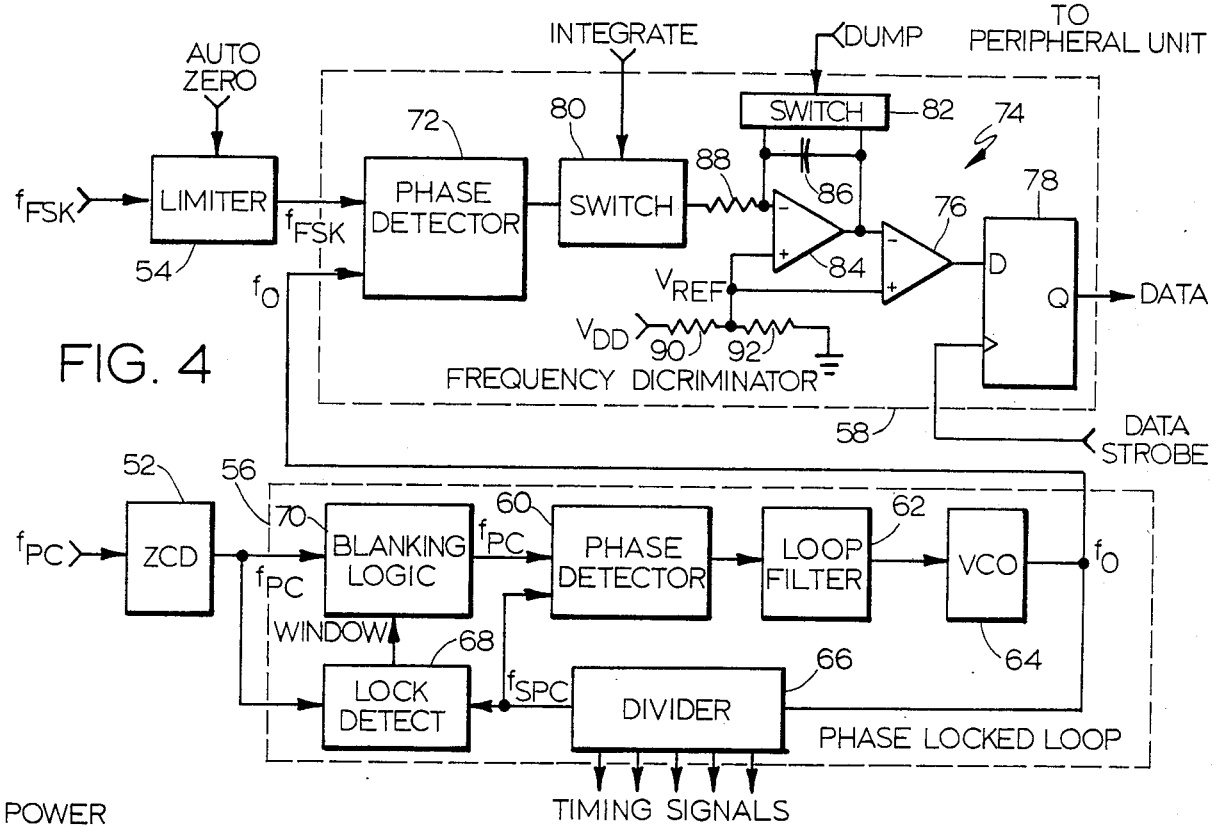
FIG. 4 is a block diagram of a preferred embodiment of the power line carrier demodulator used in the FSK receiver of FIG. 3.

FIG. 4 shows a more detailed diagram of a preferred embodiment of PLC demodulator 28. Phase locked loop 56 includes tristate phase detector 60, loop filter 62, VCO 64, divider 66, lock detect circuit 68, and blanking logic 70.

Phase detector 60 is a tristate digital phase detector which is triggered on rising edges of the power line carrier frequency $f_{PC}$ and the synthesized frequency $f_{SPC}$ from divider 66. The output of phase detector 60 is supplied through loop filter 62 to the input of VCO 64. The output of VCO 64 is reference frequency $f_O$, which is provided to frequency discriminator 58, and to divider 66. Frequency $f_O$ is divided down by divider 66 to produce the timing signals (which are used by control and interface logic 30 to coordinate operation of PLC demodulator 28) as well as frequency $f_{SPC}$. Phase locked loop 56 locks into frequency $f_{PC}$, and the synthesized reference frequency and the timing signals are all locked to leading edges of $f_{PC}$.

Lock detect circuit 68 and blanking logic 70 are a bandwidth control which alters the bandwidth of phase locked loop 56. Tristate phase detector 60 is essentially a digital system, and the appearance of spurious rising edges of $f_{PC}$ (created by noise) create unwanted states which can drive phase locked loop 56 out of lock. Zero crossing detector 52 has a sufficiently large hysteresis to prevent triggering on small noise spikes. Lock detect 68 and blanking logic 70 further reduce the likelihood of spurious rising edges by altering the bandwidth of phase locked loop 56 once phase locked loop 56 has achieved a locked condition.

When phase locked loop 56 is out of lock, all leading edges of the signal from zero crossing detector 52 are passed through blanking logic 70 to the input of phase detector 60. Once initial lock has been achieved and lock detect circuit 68 has been activated, the signal from zero crossing detector 52 is edited by use of a "window" which opens slightly before the expected rising edge of $f_{PC}$ and which closes slightly after the expected rising edge. Spurious zero crossings of the power line carrier which produce rising edges outside of the window are ignored. The operation of lock detect circuit 68 and blanking logic 70 is described in further detail in the previously-mentioned copending patent application "System For Preventing Transcient Induced Errors In Phase Locked Loop", G. Kachman, Ser. No. 306,272, filed Sept. 28, 1981.

In the embodiment shown in FIG. 4, frequency discriminator 58 includes phase detector 72, integrator circuit 74, comparator 76 and data latch flipflop 78. Phase detector 72 is preferably a tristate phase detector which compares the FSK signal frequency $f_{FSK}$ from limiter 54 and reference frequency $f_O$ from phase locked loop 56.

The output of phase detector 72 is either $V_{DD}$ (the supply voltage), ground, or a high impedance state, depending upon the phase relationship of frequencies $f_O$ and $f_{FSK}$. If $f_{FSK}$ is greater than $f_O$, more up pulses are generated than down pulses at the output of phase detector 72. Conversely, if $f_{FSK}$ is less than $f_O$, more down pulses than up pulses are generated at the output of phase detector 72. Integrator circuit 74 averages the output pulses of phase detector 72 over a portion of the bit time, and the output of integrator circuit 74 is compared to a reference voltage $V_{REF}$ by comparator 76. At the end of each bit time, the output of comparator 76 is latched into flipflop 78 by the DATA STROBE pulse.

As shown in FIG. 4, integrator circuit 74 includes switches 80 and 82, operational amplifier 84, integrating capacitor 86, and resistors 88, 90 and 92. When switch 80 is closed and switch 82 is opened, the output pulses from phase detector 72 are integrated. When switch 80 is opened and switch 82 closed, the charge on integrating capacitor 86 is removed and integrator circuit 74 is "cleared" or "reset".

The output of operational amplifier 84, which represents the integration of the output pulses from phase detector 72 is compared by comparator 76 to reference voltage $V_{REF}$. In the embodiment shown in FIG. 4, resistors 90 and 92 form a voltage divider which derives reference voltage $V_{REF}$ from supply voltage $V_{DD}$. Since operational amplifier 84 uses the same reference voltage $V_{REF}$ as comparator 76, the need for precision components to produce an accurate reference voltage is eliminated.

An example of the operation of frequency discriminator 58 is shown in FIGS. 5A through 5G. In this example, all of the waveforms shown in FIGS. 5A through 5G commence just before the end of a bit time in which $f_{FSK}$ had a frequency less than $f_O$, thereby representing a binary "0". During the first complete bit time, $f_{FSK}$ shown in FIG. 5A is greater than $f_O$, thereby indicating a binary "1". During the second complete bit time shown in $f_{FSK}$ is again less than $f_O$, thereby representing a digital "0".

At the beginning of each bit time, control and interface logic 30 produces the AUTO ZERO signal shown in FIG. 5B, which zeroes limiter 54 to eliminate offset. When the AUTO ZERO pulse is removed, the limited FSK signal is supplied by limiter 54 to phase detector 72. At the same time, the DUMP signal shown in FIG. 5C goes high and the INTEGRATE signal shown in FIG. 5D goes low, so that switch 82 is closed and switch 80 is opened. This clears integrator circuit 74, and the output of operational amplifier 84 returns to $V_{REF}$ as integrating capacitor 86 is discharged.

It has been emperically determined that phase detector 72 will not produce any spurious pulses after about one-half of the bit time. Typically phase detector 72 will produce more up pulses than down pulses when $f_{FSK}$ is greater than $f_O$ and will produce more down pulses than up pulses if $f_{FSK}$ is less than $f_O$. However, if about half the bit time has passed before integration begins, phase detector 72 has entered a region where only pulses of one direction are produced. The actual waiting time (which is approximately one-half of the bit time) is related to the beat frequency between $f_{FSK}$ and $f_O$. After the beat frequency passes through a "0", phase detector 72 acts as an ideal frequency discriminator. This phenomenon is described in further detail in the previously-mentioned copending patent application "Improved Frequency Shift Keyed Detector System", M. Hendrickson, Ser. No. 306,273, filed Sept. 28, 1981.

After half the bit time has elapsed, the DUMP signal goes low and the INTEGRATE signal goes high, thus opening switch 82 and closing switch 80. The series of output pulses from phase detector 72 are summed by integrator circuit 74. In the examples shown in FIGS. 5A through 5G during the first complete bit time in which $f_{FSK}$ is greater than $f_O$, the output of operational amplifier 84 shown in FIG. 5E rises above $V_{REF}$ in response to up pulses from phase detector 72. Conversely, during the second complete bit time the output of operational amplifier 84 decreases below $V_{REF}$ in response to down pulses from phase detector 72.

At the beginning of each bit time, control and interface logic 30 generates the DATA STROBE pulse shown in FIG. 5F, which causes the output of comparator 76 to be latched into flipflop 78. As a result, the DATA output of flipflop 78 shown in FIG. 5G is delayed by one bit period with respect to the transmitted data.

The integrate-and-dump frequency discriminator 58 shown in FIG. 4 provides both data definition and noise immunity. In addition, it does not require an accurate reference as a start point for the integration period.

Figure 6:
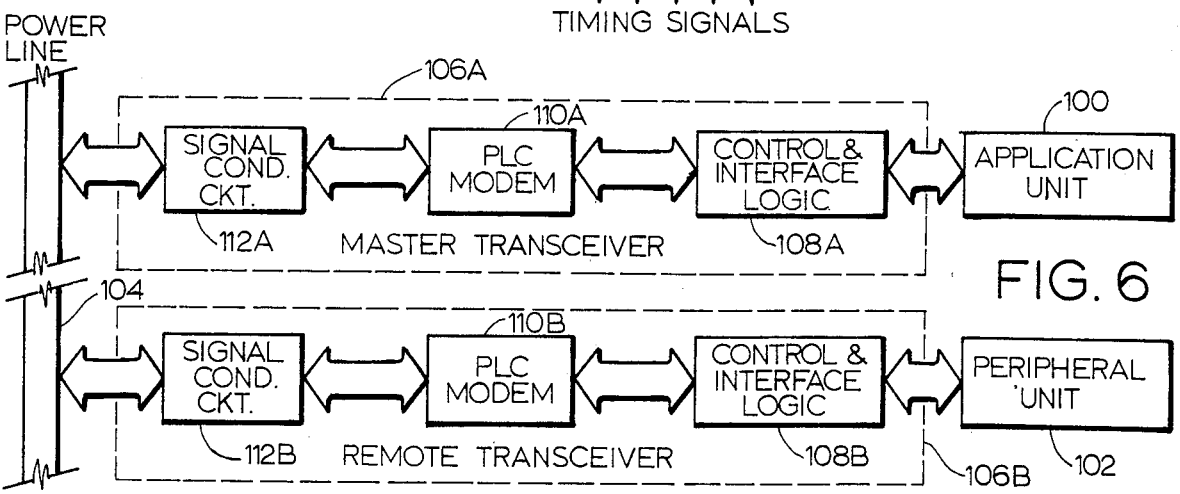
FIG. 6 is a block diagram of a second embodiment of the power line carrier FSK data system of the present invention.

The System of FIGS. 6–8

FIGS. 6–8 illustrate another embodiment of the present invention, which provides two-way data communication between application unit 100 and peripheral unit 102. The system of FIG. 6 utilizes AC power line 104 to carry signals between master transceiver 106A associated with application unit 100 and remote transceiver 106B associated with peripheral unit 102.

In one preferred embodiment of the present invention, application unit 100 is a digital computer for controlling various environment and process control functions through one or more peripheral unit 102. In this embodiment, application unit 100 communicates with master transceiver 106A via a communication link such as an RS232C serial full duplex asynchronous communications interface cable using ASCII characters. Master transceiver 106A then converts the ASCII character demands from application unit 100 to a power line communication code, and transmits that code in the form of serial FSK signals.

The commands from application unit 102 (in the form of the FSK signals) are received, demodulated, and decoded by remote transceiver 106B. Where application unit 100 controls a plurality of peripheral units 102, each command from application unit 100 preferably includes the address of a remote transceiver 106B. Each remote transceiver 106B is given a unique address, so that only one remote transceiver 106B responds to a given command. The remote transceiver 106B which is addressed by its command takes the requested action with respect to peripheral unit 102 and then sends a response message in the form of an FSK signal back to master transceiver 106A via power line 104. Master transceiver 106A demodulates the response FSK signal and converts it back to an ASCII response which is provided to application unit 100.

In the embodiment shown in FIG. 6, master transceiver 106A includes control and interface logic 108A, PLC modem 110A, and signal conditioning circuit 112A. Remote transceiver 106B includes control and interface logic 108B, PLC modem 110B, and signal conditioning circuit 112B. In preferred embodiments of the present invention, PLC modems 110A and 110B are identical devices which are, preferably, in the form of a single CMOS integrated circuit with a few external components. Similarly, in preferred embodiments signal conditioning circuits 112A and 112B are identical circuits, each of which include a low pass filter for passing frequency $f_{PC}$ and an band pass filter for passing frequency $f_{FSK}$. Control and interface logic 108A and 108B may, in some cases, differ due to different requirements in interfacing with application unit 100 and peripheral unit 102.

FIG. 7 is a block diagram showing PLC modem 110A and signal conditioning circuit 112A of master transceiver 106A. Signal conditioning circuit 112A includes band pass filter 114 and low pass filter 116, which provide an interface between power line 104 and PLC modem 110A. When modem 110A is in a "receive" mode, modem 110A receives FSK signals from band pass filter 114 at its RFM input terminal. When modem 110A is in the "transmit" mode, the FSK signal generated by modem 110A is supplied from the TFM terminal to band pass filter 114, where it is passed on to power line 104. During both the "receive" and the "transmit" modes, low pass filter 116 supplies the power line carrier frequency $f_{PC}$ from power line 104 to the LRF input terminal of modem 110A.

In the embodiment shown in FIG. 7, PLC modem 110A includes zero crossing detector 118, phase locked loop 120, limiter 122, frequency discriminator 124, data I/O port 126 and watchdog timer 128. The power line carrier signal received at the LRF input of modem 110A is sensed by zero crossing detector 118, which produces a square wave signal having a frequency $f_{PC}$ in which each leading edge corresonds to an upward zero crossing by the sinusoidal power line carrier signal at the LRF input terminal.

Phase locked loop 120 locks onto frequency $f_{PC}$ and generates all of the timing signals required for operation of modem 110A. These signals include the reference frequency $f_O$ used by frequency discriminator 124 during the "receive" mode of operation, the transmitted FSK signal which is supplied to the TFM terminal during the "transmit" mode, the AUTO ZERO signal provided to limiter 122, and the DATA STROBE (DS) signal (which is provided to frequency discriminator 124 and to control and interface logic 108A through the DS output terminal), the WD signal provided to watchdog timer 128, and the loop synthesized frequency (LSF) signal (which is provided to control and interface logic 108A through the LSF termimal). In addition, phase locked loop 120 provides a LOCK DETECT signal to data I/O port 128 which indicates whether phase locked loop 120 is in a locked condition. When phase locked loop 120 is out of lock, data I/O port 126 is disabled from providing an oscillator control (OC) signal to phase locked loop 120. As a result, modem 110A is prevented from operating in the "transmit" mode when phase locked loop 120 is out of lock.

External components connected at the LCC, ISR, LFN and OSR terminals of modem 110A determine the operating characteristics of phase locked loop 120. Capacitor 130 is connected between the LCC terminal and ground. Capacitor 130 acts as an integrator, and is used in detecting when phase locked loop 120 is in lock. The size of capacitor 130 determines how long it takes to recognize that lock has been achieved or has been lost.

Current set resistor 132 is connected between the ISR terminal and ground. Resistor 132 sets a current reference level which is used in phase locked loop 120.

Resistor 134 and capacitor 136 are connected in series between terminal LFN and ground, and capacitor 138 is connected in parallel with them. Together they form the loop filter network of phase locked loop 120.

Resistor 140 is connected between the OSR terminal and ground. Resistor 140 is an oscillator set resistor, which sets the gain of the voltage controlld oscillator of phase locked loop 120.

When modem 110A is in the "transmit" mode, data I/O port 126 receives a transmit enable signal from control and interface logic 108A at terminal XE. The data to be transmitted is received through terminal DIO by data I/O port 126, which then provides the oscillator control (OC) signal to phase locked loop 120. The OC signal causes phase locked loop 120 to temporarily speed up or slow down, so that the transmitted frequency $f_{FSK}$ supplied to terminal TFM is either sightly greater or slightly less than frequency $f_O$, which is the normal frequency of phase locked loop 120. In a preferred embodiment of the present invention, the data to be transmitted is in the form of a code which includes equal numbers of "1's" and 0's" and in which there are no long consecutive strings of "1's" or "0's". As a result, phase locked loop 120 is caused to speed up exactly half of the time and slow down exactly half of the time that it is transmitting. The average control voltage of the VCO of phase locked loop 120 remains constant, so that phase locked loop 120 is not pulled out of lock with frequency $f_{PC}$. An example of this type of data code is described in the previously-mentioned copending patent application "Data Communication System With Fixed Weight Error Correction and Detection Code", B. Ohme, Ser. No. 457,986, filed Jan. 14, 1983.

A received FSK signal from power line 104 is supplid by band pass filter 114 to the RFM terminal. Limiter 122 amplifies and squares the input signal to produce a square wave signal having frequency $f_{FSK}$. The output of limiter 122 is provided to frequency discriminator 124, and is also provided at the RO terminal. The presence of a signal at the RO terminal indicates to control and interface logic 108A that there is an FSK signal already present on power line 104. This functions, therefore, as a "busy signal" to prevent more than one transceiver from attempting to transmit on power line 104 at the same time.

Frequency discriminator 124 compares the $f_{FSK}$ frequency from limiter 122 with the reference frequency $f_O$ from phase locked loop 120. In a preferred embodiment of the present invention, frequency discriminator 124 is of the type described in the previously-mentioned copending patent applications entitled "Phase Velocity Sign Detector For Frequency Shift Key Demodulation", M. Maas, Ser. No. 404,959, filed Aug. 4, 1982, and "Frequency Shift Key Demodulator", M. Maas and M. Hendrickson, Ser. No. 404,955, filed Aug. 4, 1982.

The output of frequency discriminator 124 is data in the form of a "1" or a "0", depending upon the relationship between $f_{FSK}$ and $f_O$. During the "receive" mode, data I/O port 126 receives the data from frequency discriminator 124 and supplies the data at the DIO terminal. The data rate at which frequency discriminator 124 generates the data is determined by the DS signal from phase locked loop 120.

In a preferred embodiment of the present invention, control and interface logic 108A includes a microcomputer (not shown). Each time the DS pulse is generated by phase locked loop 120, it is provided both to frequency discriminator 124 and to the microcomputer through the DS terminal. The receipt of the DS pulse indicates to the microcomputer that a new data bit from frequency discriminator 124 is present at data I/O port 126. The new data bit at data I/O port 126 is then read by the microcomputer through the DIO terminal.

Watchdog timer 128 is a fault detecting circuit which prevents modem 110A from operating in the transmit mode if the microcomputer is not functioning properly. Watchdog timer 128 communicates with the microcomputer of control and interface logic 108A through the WDT and MRS terminals. The timing of the watchdog timer 128 is based upon the WD timing signal received from phase locked loop 120. The watchdog timer 128 requires that the microprocessor reset it within a predetermined time interval. Failure to receive a reset from the microcomputer indicates a potential malfunction, and watchdog timer 128 provides a disable signal to data I/O port 126 to prevent modem 110A from operating in the "transmit" mode.

The LSF signal supplied to control and interface logic 108A is, in one embodiment, a 120 Hz signal synthesized by phase locked loop 120 and locked to the 60 Hz frequency of the power line carrier. The LSF signal is a timing signal used by control and interface logic 108A in coordinating and synchronizing operation of transceiver 106A.

FIG. 8 is a block diagram of phase locked loop 120 of modem 110A shown in FIG. 7. In this embodiment, phase locked loop 120 includes phase detector 142, lock detector 144, blanking logic 146, charge pump 148, reference circuit 150, VCO 152, timing generation divider 154, and power on reset circuit 156.

Phase detector 144 is a tristate phase detector which compares frequency $f_{PC}$ from zero crossing detector 118 with frequency $f_{SPC}$ from timing generation divider 154. The output of phase detector 142 is provided to lock detector 144 and to blanking logic 146. When phase locked loop 120 is out of lock, lock detector 144 allows blanking logic 146 to pass the output of phase detector 142 to charge pump 148. When, on the other hand, phase locked loop 120 is in lock, lock detector 144 provides a signal to blanking logic 146 which allows the output of phase detector 142 to be provided to charge pump 148 only when the WINDOW signal from timing generation divider 156 is present. The WINDOW signal provides a time window which starts shortly before and ends shortly after an anticipated zero crossing of $f_{PC}$. As a result, lock detector 144 and blanking logic 146 limit the maximum correction to the control voltage of VCO 152 which is possible when the loop is in lock. When the loop is out of lock and the window is not in effect, the output of phase detector 142 is used to provide whatever correction is necessary to reach phase lock.

The output of blanking logic 146 is provided to charge pump 148, which provides charge and discharge currents as a function of the signal received. Reference circuit 150 provides a reference level for charge pump 148.

The loop filter network formed by resistor 134 and capacitors 136 and 138 is connected to the LFN terminal to filter the output of charge pump 148. The filtered signal is provided as an input control signal to VCO 152. In addition, VCO 152 receives the oscillator control (OC) signal which is used during the "transmit" mode to pull the frequency of VCO 152 slightly higher or slightly lower than the frequency determined by the input signal from the loop filter network. As described previously, the OC signal is used only during the transmit mode.

The output of VCO 152 is a high frequency signal which is supplied to timing generation divider 154. The frequency is divided down by divider 154 to generate the various signals required by modem 110A and control and interface logic 108A. These signals include the reference frequency $f_O$ or the transmitted FSK frequency $f_{FSK}$ (depending upon whether modem 110A is in the "receive" or the "transmit" mode), together with the AUTO ZERO signal, the synthesized power carrier frequency $f_{SPC}$, the DS signal, the LSF signal, the WD signal, and the WINDOW signal. In one advantageous embodiment of the system of FIGS. 6–8, $f_{PC}=f_{SPC}=60$ Hz, $f_O=172.8$ KHz, $f_{FSK}=172.8$ KHz$\pm 1.7$ KHz, and the data rate=360 or 720 baud.

Power on reset circuit 156 provides a reset pulse to timing generation divider 154 when power is first applied to modem 110A. This resets divider 154 to a known state at the beginning of operation of modem 110A.

CONCLUSION

The FSK data communication system of the present invention provides significant advantages over prior art data communication systems which utilize electrical power lines for data communication.

First, the present invention provides synchronized transmission and reception, since all critical signals are derived from zero crossings of the power line carrier. As a result, special encoding techniques which require a clock frequency to be transmitted to the receiver are eliminated with the present invention.

Second, the present invention provides coherent FSK data transmission. This allows the system to exhibit fast data acquisition.

Third, the use of the power line carrier frequency as a common reference eliminates the need for costly external components or component trimming. In addition, problems associated with component drift over time are eliminated.

Fourth, the present invention permits simple binary encoding to be used.

Fifth, the present invention is particularly well-suited to integrated circuit technology. As illustrated in FIG. 7, for example, modem 110A is preferably a single integrated circuit chip with only a few external components.

Although the present invention has been described with reference to preferred embodiments, workers skilled in the art will recognize that changes may be made in form and detail without departing from the spirit and scope of the invention.

What is claimed is:

1. A data communication system for communicating data between a first and a second location over an electrical power line which also carries alternating current electrical power having a frequency $f_{PC}$, the system comprising:

transmitter means at the first location for providing to the power line a periodic frequency shift keyed (FSK) signal representing a serial input stream of binary bits, the FSK signal having a frequency $f_{FSK}$ and a predetermined data rate, wherein $f_{FSK}$ is greater than the data rate, and the date rate is greater than $f_{PC}$, the transmitter means comprising:

first means for deriving from the power line a signal having frequency $f_{PC}$;

first phase locked loop means locked to the signal having frequency $f_{PC}$ for synthesizing the FSK signal and a transmitter timing signal which determines the data rate, wherein the first phase locked loop means comprises:

first oscillator means for producing the FSK signal with a frequency $f_{FSK}$ which is a function of a first control signal and a second control signal;

divider means for dividing the FSK signal to produce a synthesized signal having a frequency $f_{SPC}$ which is equal to $f_{PC}$ when the first phase locked loop means is in lock and to produce the transmitter timing signal which defines a bit time period for each bit of the serial input stream;

first phase detector means for providing a first phase detector output which is a function of a phase comparison of the signal having frequency $f_{PC}$ and the synthesized signal having frequency $f_{SPC}$; and means for providing the first control signal as a function of the first phase detector output;

control means for providing the second control signal during each bit time period which causes the first oscillator means to produce the FSK signal with a frequency $f_{FSK}$ which is greater than a reference frequency $f_O$ to represent a bit of the input stream having first binary state and is less than $f_O$ to represent a bit of the input stream having a second binary state;

means for superimposing the FSK signal onto the power line; and receiver means at the second location for providing a periodic serial output stream of binary bits, the receiver means comprising:

second means for deriving from the power line a signal having frequency $f_{PC}$;

second phase locked loop means locked to the signal having frequency $f_{PC}$ for synthesizing a reference signal having frequency $f_O$ and a receiver timing signal which determines the data rate, wherein the second phase locked loop means comprises:

second oscillator means for producing the reference signal with a frequency $f_O$ which is a function of a control signal;

divider means for dividing the reference signal to produce a synthesized signal having a frequency $f_{SPC}$ which is equal to $f_{PC}$ when the second phase locked loop means is in lock and to produce a receiver timing signal which defines a bit time period for each bit of the serial output stream;

second phase detector means for providing a second phase detector output which is a function of a phase comparison of the signal having frequency $f_{PC}$ and the signal having frequency $f_{SPC}$; and means for providing the control signal to the second oscillator means as a function of the second phase detector output;

means for deriving the FSK signal from the power line; and frequency discriminator means responsive to the receiver timing signal for providing the periodic serial output stream of binary bits as a function of periodic comparison of the FSK signal and the reference signal.

2. The system of claim 1 wherein the frequency discriminator means makes the frequency comparison of the FSK signal and the reference signal during each bit time period defined by the receiver timing signal from the second phase locked loop means.

3. The system of claim 1 wherein the first means and the second means each comprises:

low pass filter means connected to the power line for producing a filtered alternating current signal having frequency $f_{PC}$; and zero crossing detector means for producing the signal of frequency $f_{PC}$ based upon selected zero crossings of the filtered alternating current signal.

4. A transmitter of a periodic frequency shift keyed (FSK) signal carried on an electrical power line which also carries alternating current electrical power having a frequency $f_{PC}$, the FSK signal having a frequency $f_{FSK}$ during each of a sequence of bit time periods which represent binary bits to be transmitted, the transmitter comprising:

means for deriving from the power line an input signal having frequency $f_{PC}$;

phase locked loop means locked to the input signal having frequency $f_{PC}$ for synthesizing the FSK signal and a transmitter timing signal which determines the bit time periods, wherein the phase locked loop means comprises:

oscillator means for producing the FSK signal with a frequency $f_{FSK}$ which is a function of a first control signal and a second control signal;

divider means for dividing the FSK signal to produce a synthesized signal having a frequency $f_{SPC}$ which is equal to $f_{PC}$ when the first phase locked loop means is in lock and to produce the transmitter timing signal which defines the bit time period for each bit to be transmitted;

phase detector means for providing a first phase detector output which is a function of a phase comparison of the signal having frequency $f_{PC}$ and the synthesized signal having frequency $f_{SPC}$; and means for providing the first control signal as a function of the first phase detector output;

control means for providing the second control signal during each bit time period which causes the oscillator means to produce the FSK signal with a frequency $f_{FSK}$ which is greater than a reference frequency $f_O$ if the bit to be transmitted has a first binary state and which is less than $f_O$ if the bit to be transmitted has a second binary state; and means for providing the FSK signal to the power line.

5. The system of claim 4 wherein the means for deriving comprises:

low pass filter means connected to the power line for producing a filtered alternating current signal having frequency $f_{PC}$; and zero crossing detector means for producing the input signal based upon selected zero crossings of the filtered alternating current signal.

6. A receiver for demodulating a periodic frequency shift keyed (FSK) signal carried on an electrical power line which also carries alternating current electrical power having a frequency $f_{PC}$ to produce a periodic binary output signal, at a predetermined data rate, which has a first state when the FSK signal has a frequency $f_{FSK}$ which is greater than a reference frequency $f_O$ and which has a second state when $f_{FSK}$ is less than $f_O$, wherein frequencies $f_O$ and $f_{FSK}$ are greater than the data rate and wherein the data rate is greater than $f_{PC}$, the receiver comprising:

means for deriving from the power line a first input signal having the frequency $f_{PC}$;

means for deriving from the power line a second input signal having the frequency $f_{FSK}$;

phase locked loop means for locking onto frequency $f_{PC}$ of the first input signal and producing a first synthesized signal having the frequency $f_O$ and a second synthesized signal having a frequency which is related to the predetermined data rate; the phase locked loop comprising:

oscillator means for producing the first synthesized signal having frequency $f_O$ which is a function of an oscillator control signal;

divider means for dividing the frequency of the first synthesized signal to produce the second synthesized signal and a third synthesized signal of frequency $f_{SPC}$ which is equal to $f_{PC}$ when the phase locked loop is in lock;

loop phase detector means for providing a phase detector output which is a function of a phase comparison of the first input signal and the third synthesized signal; and means for providing the oscillator control signal as a function of the phase detector output to cause the third synthesized signal to have frequency $f_{SPC} = f_{PC}$ and be locked in phase with the first input signal; and frequency discriminator means for providing the binary output signal, at the data rate determined by the second synthesized signal, as a function of a comparison of the second input signal and the first synthesized signal.

7. The receiver of claim 6 wherein the means for deriving the first input signal comprises:

low pass filter means connected to the power line producing a filtered alternating current signal having frequency $f_{PC}$; and zero crossing detector means for producing the first input signal based upon selected zero crossings of the filtered alternating current signal.

8. The receiver of claim 7 wherein the zero crossing detector means produces a first input signal which exhibits a signal transition in response to selected zero crossings of the filtered alternating current signal.

9. The receiver of claim 8 wherein the selected zero crossings are upward zero crossings.

10. The receiver of claim 6 wherein the frequency discriminator means provides the binary output signal as a function of a phase comparison of the second output signal and the first synthesized signal.

11. The receiver of claim 10 wherein the frequency discriminator means comprises:

discriminator phase detector means for providing a phase detector output as a function of the second input signal and the first synthesized signal;

integrator means for integrating the phase detector output to produce an integrator signal;

output means for providing the binary output signal as a function of the integrator signal; and means responsive to the second synthesized signal for periodically resetting the integrator means to an initial state.

12. The receiver of claim 11 wherein the output means comprises:

comparator means for comparing the integrator signal with a reference level to produce a comparator output signal; and data latch means responsive to the second synthesized signal for periodically producing the binary output signal as a function of the comparator output signal.

13. The receiver of claim 12 wherein the second synthesized signal defines a sequence of bit time periods, and wherein the data latch means produces the digital output signal during each bit time as a function of the comparator output signal at the end of a preceding bit time.

14. The receiver of claim 13 wherein the means for periodically resetting clears the integrator means at the beginning of each bit time period.

15. The receiver of claim 11 wherein the discriminator phase detector means is a tristate phase detector.

16. The receiver of claim 6 wherein the second synthesized signal defines a sequence of bit time periods, and wherein the frequency discriminator means provides the binary output signal during each bit time period as a function of a comparison of the second input signal and the first synthesized signal during a preceding bit time.

17. The receiver of claim 6 wherein the means for deriving a first input signal comprises a low pass filter, and wherein the means for deriving a second input signal comprises a band pass filter.

* * * * *